United States Patent
Hiroki

(10) Patent No.: US 6,707,767 B2
(45) Date of Patent: Mar. 16, 2004

(54) DOMAIN WALL DISPLACEMENT MAGNETO-OPTICAL STORAGE MEDIUM, AND METHOD FOR REPRODUCING THEREOF

(75) Inventor: Tomoyuki Hiroki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 09/982,920

(22) Filed: Oct. 22, 2001

(65) Prior Publication Data

US 2002/0085457 A1 Jul. 4, 2002

(30) Foreign Application Priority Data

Nov. 15, 2000 (JP) ........................................ 2000-348161

(51) Int. Cl.⁷ .............................................. G11B 11/00
(52) U.S. Cl. ................................ 369/13.38; 369/13.08; 369/13.47
(58) Field of Search .................... 369/13.38, 13.08, 369/13.09, 13.35, 13.47, 13.52, 13.39, 13.4, 13.41; 428/64.3, 694 ML, 694 MM

(56) References Cited

U.S. PATENT DOCUMENTS

| | | | | |
|---|---|---|---|---|
| 5,384,758 A | * | 1/1995 | Matsumoto | 369/13.41 |
| 5,771,211 A | * | 6/1998 | Tanase et al. | 369/13.5 |
| 5,790,513 A | | 8/1998 | Hiroki et al. | 369/275.2 |
| 6,027,825 A | | 2/2000 | Shiratori et al. | 428/694 |
| 6,069,852 A | * | 5/2000 | Miyaoka et al. | 369/13.54 |
| 6,125,083 A | | 9/2000 | Nishimura et al. | 369/13 |
| 6,246,641 B1 | * | 6/2001 | Miyaoka | 369/13.05 |
| 6,249,490 B1 | * | 6/2001 | Miyaoka | 369/13.14 |

FOREIGN PATENT DOCUMENTS

| | | | | |
|---|---|---|---|---|
| EP | 0899727 | 3/1999 | | |
| JP | 6-290496 | 10/1994 | | |
| JP | 7-334877 | 12/1995 | | |
| JP | 9-312043 A | * 12/1997 | | 369/13.38 |
| JP | 11-86372 | 3/1999 | | |

\* cited by examiner

*Primary Examiner*—Tan Dinh
(74) *Attorney, Agent, or Firm*—Fitzpatrick, Cella, Harper & Scinto

(57) ABSTRACT

A magneto-optic recording medium in which information is reproduced while a recording magnetic domain is enlarged by displacing a domain wall based on a temperature distribution formed by a beam of light and having a maximum temperature Tr. The recording medium comprises a reproducing layer in which a domain wall is displaced, a recording layer for holding a recording magnetic domain corresponding to information, and a cutoff layer disposed between the reproducing layer and the recording layer and having a Curie temperature lower than those of the reproducing layer and recording layer. The recording medium satisfies the following condition;

$$(Tr-RT)/(Tc_2-RT) \geq 1.8$$

where $Tc_2$: Curie temperature of the cutoff layer, and

RT: room temperature.

5 Claims, 4 Drawing Sheets

1

DOMAIN WALL DISPLACEMENT MAGNETO-OPTICAL STORAGE MEDIUM, AND METHOD FOR REPRODUCING THEREOF

BACKGROUND OF THE INVENTION

1. Field of the Invention

The present invention relates to a magneto-optic recording medium used for recording and reproducing information with a laser beam based on the magneto-optic effect. More particularly, the present invention relates to a magneto-optic recording medium utilizing the DWDD (Domain Wall Displacement Detection) technique.

2. Description of the Related Art

Hitherto, as one method for realizing high-density recording in a rewritable manner, attention has been focused upon a magneto-optic recording medium on which information is recorded by writing magnetic domains in a magnetic thin film with thermal energy of a semiconductor laser, and from which the recorded information is read based on the magneto-optic effect. In recent years, because of the necessity of handling data containing in formation in various forms, such as voices, still images and motion images, and because of the ever increasing size of such data to be handled, the demand has grown for increasing the recording density of a magneto-optic recording medium and providing a recording medium with a larger capacity.

Generally, the recording density of a magneto-optic recording medium, such as a magneto-optic (optical) disk, greatly depends upon the laser wavelength of a reproduction optical system and the numerical aperture NA of an objective lens. In other words, once the laser wavelength $\lambda$ of a reproduction optical system and the numerical aperture NA of an objective lens are decided, the diameter of the beam width is also decided. Hence, the spatial frequency of recording pits, which can be reproduced as a signal, has an upper limit of about $2NA/\lambda$.

To realize a higher density in conventional optical discs, therefore, it is required to shorten the laser wavelength of a reproduction optical system or to increase the numerical aperture of an objective lens. However, shortening the laser wavelength is difficult because of problems such as efficiency and heat generation of a laser device. Also, if the numerical aperture of an objective lens is increased, the distance between the lens and the disk becomes so small as to cause a mechanical problem in that the disk may strike the lens.

Meanwhile, the so-called magnetic ultra-resolution technique has been developed with the intent to increase the recording density by improving the structure of a recording medium and the reproducing method. For example, Japanese Patent Laid-Open No. 7-334877 proposes an ultra-resolution method. According to this proposed method, a memory layer for holding recording information, a reproduction layer for masking a part of a reproduction light spot, and a cutoff layer for controlling an exchange coupling force between the memory layer and the reproduction layer are formed in a multilayered structure. The recording information is transferred to the reproduction layer essentially in the part of the reproduction light spot by utilizing a temperature distribution generated in the medium upon irradiation of the spot, whereby the recording information is reproduced from a minute magnetic domain.

However, the above conventional ultra-resolution method has a problem in that the light in a masked portion is wasted and the amplitude of a reproduced signal is reduced, because the resolution power is increased when masking a part of the reproduction light spot based on a temperature distribution; namely, by essentially restricting an aperture for reading a pit to a smaller area. Stated otherwise, since the light in the masked portion does not contribute to generating the reproduced signal, the amount of effectively available light is reduced as the aperture is narrowed to improve resolution. This results in a lowered signal level.

Also, Japanese Patent Laid-Open No. 6-290496 discloses a method in which a displacement layer having a small domain wall coercive force is provided on the incident side of reproduction light relative to a memory layer, and a domain wall in the displacement layer is displaced toward the higher temperature side based on a temperature gradient generated in a reproduction light spot. This reproduces information from a magnetic domain while enlarging it within the spot. According to this disclosed method, since a signal is reproduced while enlarging a magnetic domain, the reproduction light can be effectively used even when a recording mark has a smaller size. Hence, the resolution power can be increased without deteriorating the amplitude of the reproduced signal.

With recent improvements in information processing technology, not only is large capacity required, but also high-speed recording/reproducing techniques are demanded in the field of large-capacity recording media. The method disclosed in the above-cited Japanese Patent Laid-Open No. 6-290496 presents a novel approach by increasing the medium capacity through a process of displacing a domain wall based on a temperature gradient generated in a reproduction light spot and reproducing information from a magnetic domain while enlarging it within the spot. However, the disclosed method does not consider its impact on transfer rate. The method causes a problem in that, depending on the structure of a recording medium, the quality of a reproduced signal is greatly deteriorated when the medium is moved at high linear speeds.

Further, when trying to produce a temperature gradient for displacing a domain wall by heating a recording medium with a reproduction laser beam itself, the peak of a temperature distribution is formed within the reproduction light spot. Therefore, such an attempt raises the problem that domain walls are displaced toward the reproduction light spot respectively from the upstream (forward) and downstream (backward) sides in the moving direction of the recording medium relative to the reproduction light spot and are read as leaked signals with the spot. This makes it difficult to obtain a good reproduced signal. To overcome that problem, it has been proposed to provide a means for producing a desired temperature distribution separately from the reproduction laser beam. This solution, however, raises another problem in that it makes a reproducing apparatus complicated.

Japanese Patent Laid-Open No. 11-86372 discloses a method of restraining displacement of a domain wall from the downstream side by applying a reproduction magnetic field. However, the disclosed method requires a means for separately adding the reproduction magnetic field and also makes the reproducing apparatus complicated.

SUMMARY OF THE INVENTION

With the view of overcoming the problems mentioned above, it is an object of the present invention to provide a magneto-optic recording medium and a reproducing method and apparatus, by which a signal with a recording density in excess of the resolution of an optical system can be reproduced at high speed without making the reproducing apparatus and the medium structure complicated.

The above object is achieved with a magneto-optic recording medium of the present invention constructed as follows.

In a magneto-optic recording medium in which information is reproduced while a recording magnetic domain is enlarged by displacing a domain wall based on a temperature distribution formed by a beam of light and having a maximum temperature Tr, the recording medium comprises a reproducing layer in which a domain wall is displaced; a recording layer for holding a recording magnetic domain corresponding to information; and a cutoff layer disposed between the reproducing layer and the recording layer and having a Curie temperature lower than those of the reproducing layer and the recording layer, wherein the recording medium satisfies the following condition;

$$(Tr-RT)/(Tc_2-RT) \geq 1.8$$

where $Tc_2$: Curie temperature of the cutoff layer, and

RT: room temperature.

Also, the above object is achieved with a reproducing method and apparatus for reproducing recorded information from the magneto-optic recording medium set forth above. Specifically, the reproducing method includes reproducing recorded information form a magneto-optical recording medium comprising recording information on the recording layer and thereafter reproducing the information while displacing the domain wall by the beam of light to enlarge the recording magnetic domain and the apparatus includes an optical disk comprising a substrate having a tracking guide groove and the magneto-optical recording medium of the invention formed thereon.

Further objects, features and advantages of the present invention will become apparent from the following description of the preferred embodiments with reference to the attached drawings.

DESCRIPTION OF THE PREFERRED EMBODIMENTS

One embodiment of the present invention will be described below in detail with reference to the drawings.

Figure 1A:
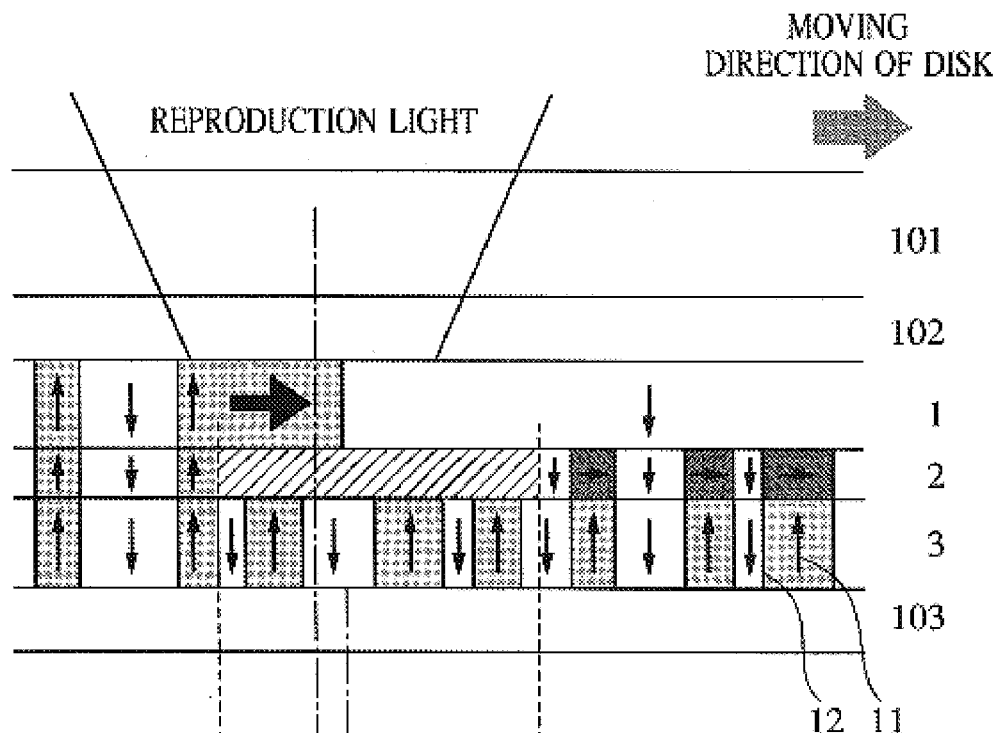
FIG. 1A is a diagrammatic sectional view of an optical disk.

FIG. 1A is a diagrammatic sectional view of an optical disk (recording medium) according to one embodiment of the present invention. As shown in FIG. 1A, the optical disk of this embodiment has a multilayered structure comprising an interference layer 102, a reproducing or displacement layer 1, a cutoff layer 2, a recording or memory layer 3 for holding a recording magnetic domain, and a protective layer 103, which are successively formed on a substrate 101 in the order named. An arrow 11 in each magnetic substance layer represents the direction of sublattice (staggered) magnetization of a transition metal in a recording magnetic domain held in a film. A Bloch magnetic wall 12 exists at the interface between adjacent magnetic domains where the magnetization is not parallel. The substrate 101 is usually formed of a transparent material such as glass or polycarbonate. The above-mentioned layers can be formed by successive sputtering or successive vapor deposition using a magnetron sputtering apparatus. The interference layer 102 is provided to increase the magneto-optic effect, and is formed of a transparent dielectric material such as $Si_3N_4$, AlN, $SiO_2$, SiO, ZnS or $MgF_2$. The protective layer 103 is provided to protect the other magnetic layers, and is formed of the same material as that of the interference layer 102. To optimize the entire thermal structure of the medium, a metal layer formed of, e.g., Al, AlTa, AlTi, AlCr or Cu may be additionally provided on the protective layer 103. The interference layer 102, the protective layer 103, and the metal layer, which are provided as required, are conventional layers well known to those skilled in this art.

The recording or memory layer 3 is formed of a rare earth—iron-group element amorphous alloy such as TbFeCo, DyFeCo or TbDyFeCo; that is, a material having a large perpendicular magnetic anisotropy and being able to stably hold a minute recording pit. Recording information is stored depending upon whether a magnetic domain in the memory layer 3 is magnetized upward or downward. Alternatively, a perpendicularly magnetized film formed of, e.g., garnet, Pt/Co or Pd/Co may be used so that information can be magnetically transferred to another layer.

The cutoff layer 2 is formed of a rare earth—iron-group element amorphous alloy such as GdCo, GdFeCo, GdFe, GdFeCoAl, DyFeCoAl, TbDyFeCoAl or TbFeAl. The Curie temperature $Tc_2$ of the cutoff layer 2 is set to be lower than those of the displacement layer 1 and the memory layer 3.

The reproducing or displacement layer 1 is formed of a rare earth—iron-group element amorphous alloy having a small perpendicular magnetic anisotropy, such as GdCo, GdFeCo, GdFe or NdGdFeCo, or a material for bubble memories, such as garnet. When a rare earth—iron-group element amorphous alloy is used, it preferably has a composition in which the sublattice (staggered) magnetization of a rare earth element prevails at room temperature. The reason is as follows.

If the saturation magnetization of the displacement layer is a large value at the temperature at which a domain wall is displaced, the displacement of the domain wall would be unstable because it would be easily affected by a floating magnetic field generated from an external magnetic field or the memory layer. In contrast, when the displacement layer has a composition in which the sublattice magnetization of a rare earth element prevails at room temperature, the saturation magnetization of the displacement layer at the temperature, at which a domain wall is displaced, can be reduced and hence the displacement of the domain wall can be stabilized.

The film thickness of each of the component layers is given as below. The interference layer 102 is 60–100 nm, the displacement layer 1 is 20–40 nm, the cutoff layer 2 is 5–20 nm, the memory layer 3 is 40–100 nm, and the protective layer 103 is 40–80 nm.

In addition to the above-described structure, a protective coating of a high polymer resin may be employed. As an alternative, one substrate 101 having the component layers formed thereon may be bonded to similar another one.

A data signal is recorded on the optical disk (recording medium) of this embodiment by moving the medium and modulating an external magnetic field while irradiating a laser beam with power sufficient to heat the recording or memory layer 3 to a level of approximately the Curie temperature $Tc_3$, or by moving the medium and modulating the laser power while applying a magnetic field in a constant direction. In the latter case, by adjusting the intensity of a laser beam so that only a predetermined area within a laser beam spot reaches $Tc_3$, a recording magnetic domain smaller than the diameter of the laser beam spot can be formed. As a result, a signal having a cycle smaller than the diffraction limit of the laser beam can be recorded.

Figure 1B:
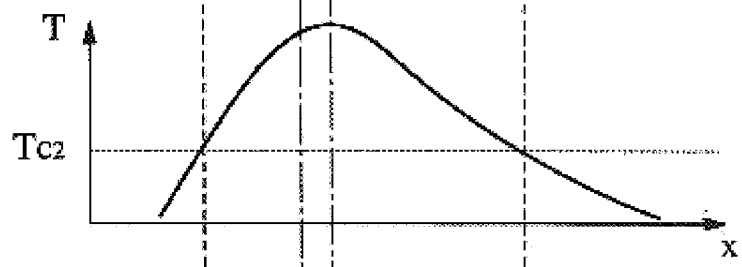
FIGS. 1B and 1C are charts for explaining the principle of displacement of a domain wall in the present invention.
Figure 1C:
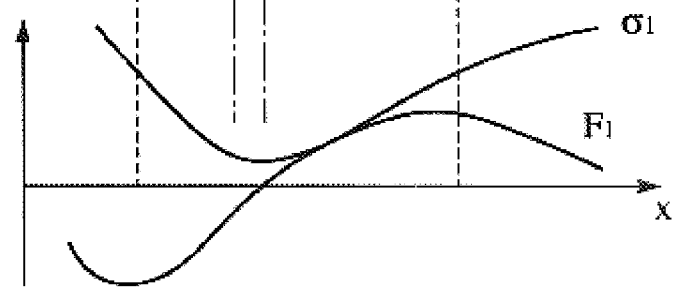

FIG. 1B shows a temperature distribution at the track center which resulted when the optical disk is moved to the right in the drawing while irradiating the laser beam to the disk. In such a temperature profile, a peak at which the film temperature is maximized is positioned, depending, in part, upon the linear speed of the disk, slightly downstream (backward) from the center of the laser beam spot. FIG. 1C shows a distribution of domain wall energy density $\sigma_1$ in the displacement layer 1. As seen from FIG. 1C, the domain wall energy density $\sigma_1$ decreases as temperature rises. Accordingly, if there is a temperature gradient in the moving direction of the disk, the domain wall energy density $\sigma_1$ gradually decreases toward the position of maximum temperature. Hence, a force $F_1$ expressed by the following formula acts upon a domain wall that is present at a position x in each layer:

$$F_1 = d\sigma_1/dx$$

Force $F_1$ acts upon the domain wall to displace it toward the side where the domain wall energy is lower. Since the displacement layer 1 has a small domain wall coercive force and a large domain wall mobility, the domain wall is easily displaced in the displacement layer 1 under a force $F_1$ when it is alone in a decoupled state.

In FIG. 1A, before a reproduction laser beam is irradiated onto the disk, i.e., in a portion of the disk at room temperature, since the respective magnetic layers are each formed of a perpendicularly magnetized film, a magnetic domain recorded in the memory layer 3 is in an exchange coupling relation to the displacement layer 1 through the cutoff layer 2, and the magnetic domain is transferred to the displacement layer 1. At that time, the magnetic wall 12 exists at the interface between adjacent magnetic domains in each layer where the magnetization indicated by the arrow 11 is opposite to each other. In a portion of the cutoff layer 2 where the film temperature is higher than the Curie temperature $Tc_2$, the magnetization in the cutoff layer 2 disappears, and the exchange coupling between the cutoff layer 2 and the memory layer 3 is disconnected.

In this condition, since the displacement layer 1 has a small domain wall coercive force, the domain wall in the displacement layer 1 is displaced toward the higher temperature side under force $F_1$ applied to the domain wall based on the temperature gradient. The speed at which the domain wall displaces at that time is sufficiently faster than the moving speed of the disk. This means that a greater domain wall than that recorded in the memory layer 3 can be obtained in the laser beam spot. An aperture area in the reproduction light spot, which contributes to displacing the domain wall, can be regarded as ranging almost from an isothermal line of $Tc_2$ to a point near the maximum temperature in the temperature distribution, and the spot does not entirely take part in displacing the domain wall.

The temperature distribution in the medium depends upon not only the thermal structure of the medium, but also upon the linear speed thereof. As the linear speed increases, the position of the maximum temperature shifts to the downstream side, and an area having a temperature lower than $Tc_2$ increases on the upstream side relative to the center of the spot. If the thermal design is unsatisfactory, the aperture position may greatly deviate from the spot center depending upon the linear speed, thus resulting enhanced undesired jitter. For that reason, the temperature $Tc_2$ at which the domain wall starts displacing is preferably set to be slightly lower than a certain level so that a relatively large margin of error is provided.

Further, as the medium temperature gradually lowers on the downstream side of the spot, the magnetic domain is transferred again from the memory layer 3 to the displacement layer 1, and a magnetic wall generated upon the retransfer of the magnetic domain may displace toward the higher temperature side, i.e., toward the spot center. If a domain wall displaced from the downstream side enters the spot, noise occurs in a reproduced signal and precise reproduction of information can no longer be ensured. That point will be described in more detail with reference to FIG. 2.

Figure 2A:
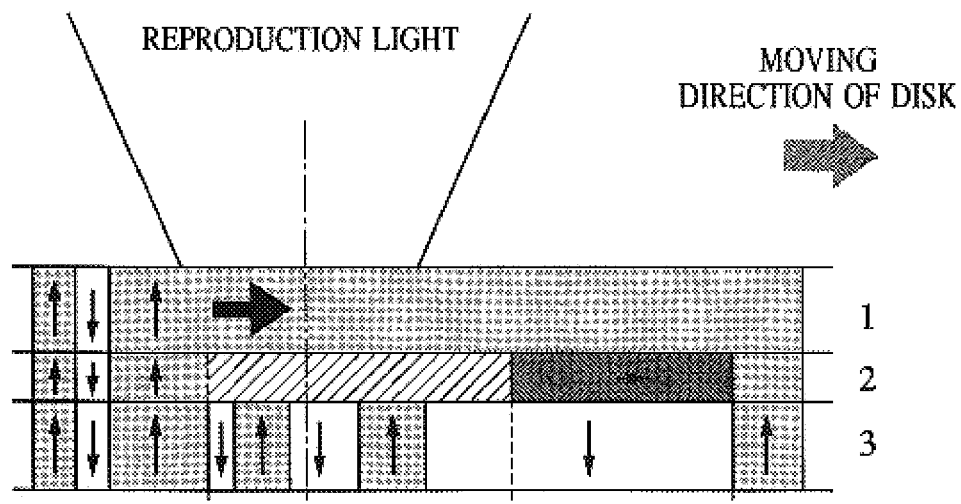
FIGS. 2A, 2B and 2C are diagrammatic sectional views for explaining the occurrence of a ghost signal.
Figure 2B:
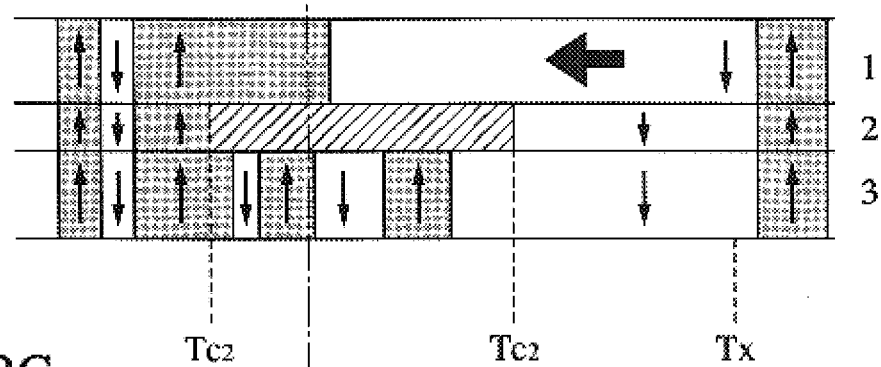

In FIG. 2A, at a position where the temperature is slightly lower than $Tc_2$ on the downstream side of the spot, since the displacement layer 1 and the memory layer 3 are magnetized in opposite directions, a domain wall exists in the cutoff layer 2 or at the interface between the cutoff layer 2 and the displacement layer 1 or the memory layer 3. When the medium is further moved and the temperature at the position of the interface domain wall is lowered to a certain level Tx, the interface domain wall energy overcomes the coercive force energy of the displacement layer 1 and transfer of the domain wall from the memory layer 3 to the displacement layer 1 occurs again, as shown in FIG. 2B. Then, a Bloch domain wall produced in the displacement layer 1 at that time is forced to displace toward the higher temperature side, i.e., toward the spot center, and mixes as a ghost signal in a reproduced signal.

Figure 2C:
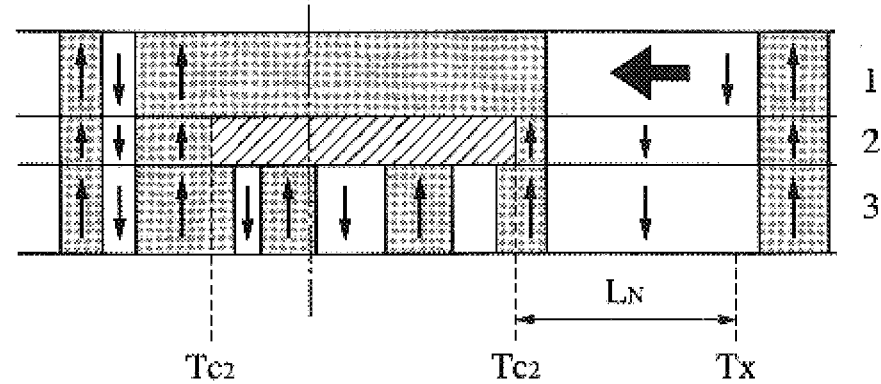

As shown in FIG. 2C, however, even when the domain wall is transferred again from the memory layer 3 to the displacement layer 1 at Tx, the domain wall displaced from Tx is stopped at the $Tc_2$ position and mixing of a ghost signal in a reproduced signal can be avoided if a succeeding domain wall approaches the $Tc_2$ position and exchange coupling is established between the memory layer 3 and the displacement layer 1. In other words, a distance $L_N$ from $Tc_2$ to Tx determines a maximum mark length that can be recorded.

When mark position recording is employed as a method for recording data on the medium, the necessity of considering the effect of a ghost signal is eliminated by setting one of upward and downward magnetic domains as a short mark. The mark position recording is, however, disadvantageous in not being able to increase the recording density beyond a certain level. For the purpose of realizing a recording medium with a larger capacity, it is therefore preferable to employ mark length recording while suppressing a ghost signal.

As a result of conducting studies with regard to a domain wall displacement medium and evaluating medium characteristics while changing the Curie temperature $Tc_2$ of the cutoff layer 2, the following conclusions were reached. Assuming that a maximum temperature in a temperature distribution during the reproduction of recording information is Tr and room temperature is RT, when the medium satisfies the following formula;

$$(Tr-RT)/(Tc_2-RT) \geq 1.8$$

a signal can be stably reproduced without a deterioration in signal quality despite movement of the medium at a high linear speed. At the same time, since $Tc_2$ can be set to a value sufficiently lower than the maximum temperature Tr, $Tc_2$ and Tx relating to the occurrence of a ghost signal can be set in a region downstream of the spot where the temperature gradient is moderate. As a result, the maximum mark length $L_N$ can be increased.

As described above, by employing the optical disk of this embodiment, even when the medium is moved at high speed, it is possible to stably reproduce a signal from a magnetic domain located upstream (forward) of a reproduction laser beam near a position corresponding to the temperature $Tc_2$ while enlarging the magnetic domain within a laser beam spot and simultaneously preventing a useless signal from leaking into the spot from the downstream (backward) side thereof. Even in the case of increasing the linear recording density, therefore, a reproduced signal of a sufficiently large amplitude can be obtained without being affected by an optical diffraction limit, while utilizing relatively simple reproducing apparatus and medium structure.

EXAMPLE 1

Targets of Si doped with B, Gd, Dy, Tb, Fe and Co were mounted in a DC magnetron sputtering apparatus, and a polycarbonate substrate having a tracking guide groove formed therein was fixed to a substrate holder. Then, a chamber space was evacuated by a cryopump to establish a vacuum not higher than $1 \times 10^{-5}$ Pa. While continuing the vacuum evacuation, Ar gas was introduced into the chamber until the pressure reached 0.5 Pa. While rotating the substrate, component layers were formed thereon as mentioned below by sputtering of the targets. Note that, when forming a SiN layer, $N_2$ gas was introduced in addition to Ar gas and the film was formed by DC reactive sputtering.

First, a SiN layer was formed as an underlying layer with a film thickness of 90 nm. Then, a GdFeCoAl layer was formed as the displacement layer with a film thickness of 30 nm. Thereafter, a TbFeAl layer was formed as the cutoff layer with a film thickness of 10 nm, and a TbFeCo layer was formed as the memory layer with a film thickness of 80 nm in succession. Finally, a SiN layer was formed as the protective layer with a film thickness of 50 nm.

The composition ratio of each magnetic layer was controlled by adjusting the ratio of applied power to the targets of Gd, Tb, Fe, Co and Al. The adjustment was made such that the Curie temperature $Tc_1$ of the replacement layer was about 250° C., the Curie temperature $Tc_2$ of the cutoff layer was about 120° C., and the Curie temperature $Tc_3$ of the memory layer was about 290° C.

Figure 3:
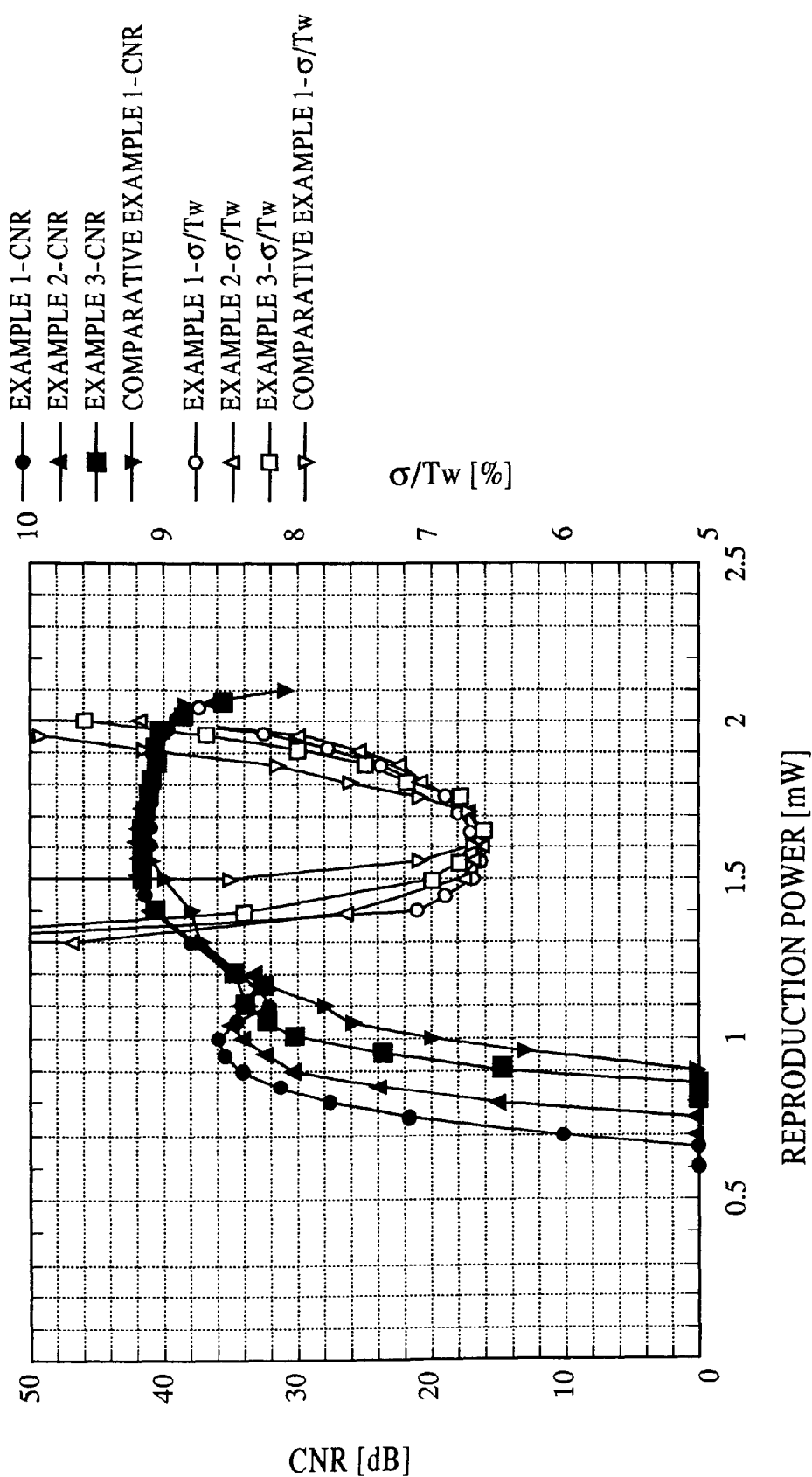
FIG. 3 is a graph showing dependency of CNR and σ/Tw upon reproduction laser power at a linear speed of 1.5 m/s in the Examples of the present invention and the Comparative Example.

Signal recording and reproduction with a mark length of 0.15 μm were performed on a thus-fabricated disk by condensing a laser beam of 680 nm wavelength onto the recording film through an objective lens of NA 0.60 and then applying an external magnetic field, while the disk was rotated at a linear speed of 1.5 m/s. The resulting relationships of CNR and σ/Tw, which indicate stability of a reproduced signal versus reproduction laser power are shown in FIG. 3. Herein, σ/Tw represents a value obtained by normalizing the standard deviation of variations in pulse width of the reproduced signal, i.e., jitter, with a time width Tw (100 ns in this case) of the recording mark.

Generally, an error rate of not higher than 1E-4 is required as a guideline for reproducing information with high reliability. To meet such a requirement, jitter must be within 14% with respect to a window width. In the case of employing (1–7)RLL modulation known as a high-density recording modulation method, for example, a minimum mark length is 2T and hence the window width is ½ of the minimum mark length. In other words, to obtain a satisfactory error rate when the minimum mark length is set to 0.15 μm, σ/Tw is desirably not larger than 7%.

When a domain wall has begun displacement upon the temperature within a laser beam spot reaching $Tc_2$ at the reproduction power of 0.70 mW and the temperature difference between the maximum temperature within the spot and room temperature (25° C.) is proportional to the reproduction power, it is estimated that the maximum temperature Tr within the spot at the reproduction power of 1.6 mW, at which σ/Tw is minimized, is 240° C. The data of σ/Tw= 6.6% obtained in this Example represents a value ensuring a satisfactory error rate when the minimum mark length is set to 0.15 μm in the (1–7)RLL modulation, for example.

Table 1 shows results obtained by conducting the same measurement as mentioned above at different linear speeds. As seen from Table 1, signal reproduction could be performed with σ/Tw=6.6 to 6.7% ranging from low to high linear speed, i.e., with stability at a level satisfactory from the viewpoint of information recording.

Then, a signal was recorded on the disk of this Example while gradually changing the mark length, and a maximum mark length free from a ghost signal was measured. Measured results are also shown in Table 1. As seen from Table 1, stable recording and reproduction free from a ghost signal could be performed at maximum mark lengths of 0.80 to 1.00 μm for the respective linear speeds. Although a maximum recording mark length differs depending upon the kind of codes to be recorded, a ratio of the minimum mark length to the maximum mark length is 4, for example, in the (1–7) RLL modulation. Therefore, when the minimum mark length is set to 0.15 μm, the maximum mark length is 0.60 μm. This means that the disk fabricated in this Example has a sufficient margin.

Additionally, to achieve smoother displacement of the domain wall, groove portions were annealed using a high-power laser in this Example prior to the start of signal recording and reproduction so that no domain walls occur at side portions of a track.

EXAMPLE 2

On the same substrate as used in Example 1, multilayered films were formed exactly in the same manner as in Example 1 except that the Curie temperature $Tc_2$ of the cutoff layer 2 was set to 130° C.

First, data obtained in this Example at the linear speed of 1.5 m/s is shown in FIG. 3. Since the displacement layer 1 was formed of the same film as in Example 1, the optimum reproduction power and the maximum temperature Tr at the optimum reproduction power were not changed. However, because the Curie temperature $Tc_2$ of the cutoff layer 2 was set to 130° C., the minimum reproduction power at which a domain wall started displacement was slightly increased to 0.80 mW. Then, the disk of this Example was measured for an optimum value of σ/Tw and a maximum mark length free from a ghost signal while changing the linear speed. Measured results are shown in Table 1. As seen from Table 1, satisfactory results were obtained in this Example 2 as with Example 1. Particularly, in the case of employing the (1–7)

RLL modulation, signal reproduction was performed with a sufficient margin.

EXAMPLE 3

On the same substrate as used in Example 1, multilayered films were formed exactly in the same manner as in Example 1 except that the Curie temperature $Tc_2$ of the cutoff layer 2 was set to 145° C.

First, data obtained in this Example at the linear speed of 1.5 m/s is shown in FIG. 3. Since the displacement layer 1 was formed of the same film as in Examples 1 and 2, the optimum reproduction power and the maximum temperature Tr at the optimum reproduction power were not changed. However, because the Curie temperature $Tc_2$ of the cutoff layer 2 was set to 145° C., the minimum reproduction power at which a domain wall started displacement was further increased to 0.90 mW. Then, the disk of this Example was measured for an optimum value of σ/Tw and a maximum mark length free from a ghost signal while changing the linear speed. Measured results are shown in Table 1. As seen from Table 1, in Example 3, the optimum value of σ/Tw was comparable to those in Examples 1 and 2, but the maximum mark length free from a ghost signal was reduced to 0.60 μm when the linear speed was relatively low. That value of the maximum mark length represents a level at which the disk can be closely used with almost no margin in the case of employing the (1–7) RLL modulation.

Comparative Example

On the same substrate as used in Example 1, multilayered films were formed exactly in the same manner as in Example 1 except that the Curie temperature $Tc_2$ of the cutoff layer 2 was set to 160° C.

First, data obtained in this Comparative Example at the linear speed of 1.5 m/s is shown in FIG. 3. Since the displacement layer 1 is formed of the same film as in each of Examples, the optimum reproduction power and the maximum temperature Tr at the optimum reproduction power are not changed. However, because the Curie temperature $Tc_2$ of the cutoff layer 2 was set to 160° C., the minimum reproduction power at which a domain wall started displacement was increased to 0.95 mW. Then, the disk of this Comparative Example was measured for an optimum value of σ/Tw and a maximum mark length free from a ghost signal while changing the linear speed. Measured results are shown in Table 1. As seen from Table 1, in this Comparative Example, σ/Tw deteriorates abruptly as the linear speed increases, and a ghost signal was more likely to occur over a wide range of the linear speed. These results mean that great restraints are imposed upon selection of the modulation method and high-speed reproduction is very difficult to achieve.

EXAMPLE 4

The same multilayered films as those in Example 1 were formed on a substrate having a deep step (level difference) between lands and grooves. With that structure, magnetic coupling was disconnected at side portions of a track at the same time as the films were formed. Hence, the annealing performed in Example 1 using a high-power laser was omitted.

Figure 4:
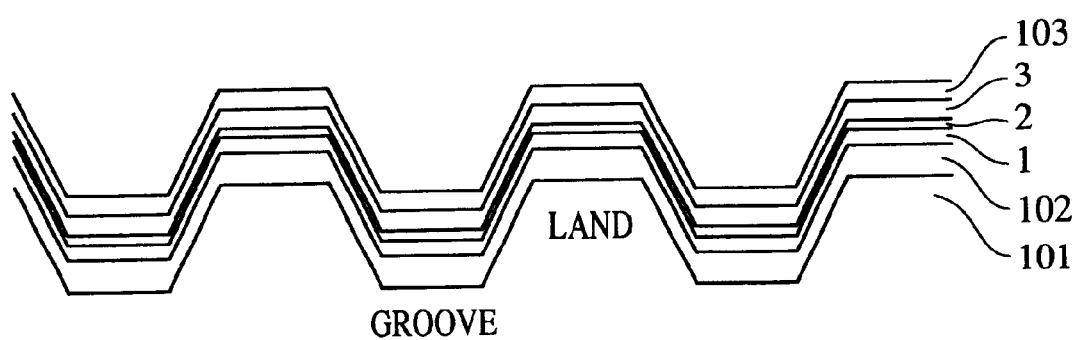
FIG. 4 is a sectional view of a substrate used in Example 4 of the present invention.

FIG. 4 is a sectional view of an optical disk of this Example. A rectangular guide groove having a depth of 180 nm was formed in the substrate 101. The respective films were formed on the substrate in the same manner as in Example 1. Although the films were slightly deposited on a tapered portion, the film thickness in the tapered portion was much thinner than that in the land and groove portions. Therefore, magnetic coupling in the stepped portion was negligible.

Information recording and reproduction were performed on the disk of this Example using the same optical head as used in Example 1. As a result, a reproduced signal comparable to that in Example 1 was obtained. Also, the recording density in the direction of track pitch was improved by the use of land/groove recording.

TABLE 1

| | | Example 1 | Example 2 | Example 3 | Com. Example |
|---|---|---|---|---|---|
| $Tc_2$ | | 120 | 130 | 145 | 160 |
| Tr | | 240 | 240 | 240 | 240 |
| $(Tr-RT)/(Tc_2-RT)$ | | 2.3 | 2.0 | 1.8 | 1.6 |
| σ/Tw (maximum mark length) | 1.5 m/s | 6.6 (0.80) | 6.7 (0.75) | 6.6 (0.60) | 6.6 (0.35) |
| | 3.0 m/s | 6.6 (0.85) | 6.6 (0.75) | 6.7 (0.60) | 7.5 (0.35) |
| | 4.5 m/s | 6.6 (0.90) | 6.7 (0.80) | 6.8 (0.65) | 9.1 (0.40) |
| | 6.0 m/s | 6.7 (1.00) | 6.8 (0.85) | 7.0 (0.70) | 11.5 (0.45) |

As described above, by employing the magneto-optic recording medium of the present invention, the information recording density on the medium can be noticeably improved, and a reproduced signal can be obtained from a minute recording magnetic domain with the same amplitude as that obtained from a relatively large magnetic domain. Also, the medium of the present invention can reproduce a signal with stability even when it is moved at a high speed. Further, since a ghost signal is prevented from leaking from the downstream side of a reproduction light spot, a medium having a larger capacity can be realized without making a recording and reproducing apparatus complicated and elevating the cost, while the construction of the apparatus remains the same as for conventional apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magneto-optic recording medium in which information is reproduced while a recording magnetic domain is enlarged by displacing a domain wall based on a temperature distribution formed by a beam of light and having a maximum temperature Tr comprising:

a reproducing layer in which a domain is displaced;

a recording layer for holding a recording magnetic domain corresponding to information; and a cutoff layer disposed between said reproducing layer and said recording layer and having a Curie temperature lower than a Curie temperature of both said reproducing layer and said recording layer, wherein the recording medium satisfies the following condition;

$(Tr-RT)/(Tc_2-RT) \geq 1.8$ where

Tc$_2$: Curie temperature of said cutoff layer, and

RT: room temperature.

2. A magneto-optic reproducing medium according to claim 1, wherein said reproducing layer, said recording layer, and said cutoff layer are each formed of a rare earth—iron-group element amorphous alloy, and said reproducing layer has a composition in which sublattice magnetization of a rare earth element prevails at room temperature.

3. A magneto-optic recording medium according to claim 1, wherein said reproducing layer is magnetically separated between adjacent information tracks.

4. A reproducing method for reproducing recorded information from a magneto-optic recording medium according to claim 1, which comprises:

recording information on said recording layer and thereafter reproducing said information, while displacing the domain wall by the beam of light to enlarge the recording magnetic domain.

5. An optical disk for reproducing recorded information comprising:

a substrate having a tracking guide groove and a magneto-optic recording medium of claim 1 formed thereon.

* * * * *